United States Patent [19]

Jerman

[11] Patent Number: 5,069,419
[45] Date of Patent: Dec. 3, 1991

[54] SEMICONDUCTOR MICROACTUATOR

[75] Inventor: John H. Jerman, Palo Alto, Calif.

[73] Assignee: IC Sensors Inc., Milpitas, Calif.

[21] Appl. No.: 370,545

[22] Filed: Jun. 23, 1989

[51] Int. Cl.$^5$ .................. F16K 7/14; F16K 31/02; G01B 9/02; F03G 7/06

[52] U.S. Cl. .................... 251/11; 251/331; 251/129.01; 356/345; 60/528; 60/529

[58] Field of Search .............. 251/11, 331, 129.01; 60/527, 528, 529; 356/345, 352

[56] References Cited

U.S. PATENT DOCUMENTS

| | | | |
|---|---|---|---|
| 4,318,071 | 3/1982 | Shepherd | 60/528 X |
| 4,756,508 | 7/1988 | Giachino et al. | 251/368 X |
| 4,825,262 | 4/1989 | Mallinson | 356/352 |
| 4,859,060 | 8/1989 | Katagiri et al. | 356/352 |
| 4,864,824 | 9/1989 | Gabriel et al. | 60/528 X |

Primary Examiner—Arnold Rosenthal
Attorney, Agent, or Firm—Fitch, Even, Tabin & Flannery

[57] ABSTRACT

A semiconductor microactuator has a silicon semiconductor substrate having suspension means connected thereto. The suspension means has a first layer of material having a first thermal expansion coefficient and a second layer of material having a second thermal expansion different than the first thermal expansion coefficient and may be a part of a diaphragm or a pair of connecting members. A movable element, which may be a second part of the diaphragm or a boss, is connected to the suspension to be displaced thereby as the temperature of the first and second layers of material is varied. The displacement is solely irrotational with respect to the semiconductor substrate.

13 Claims, 6 Drawing Sheets

SEMICONDUCTOR MICROACTUATOR

BACKGROUND OF THE INVENTION

The invention relates to thermally responsive semiconductor actuators and, in particular, to semiconductor microactuators having deformable members comprised of at least two portions having differing thermal coefficients of expansion for effecting solely translational displacement of the deformable member as its temperature varies.

Silicon devices currently are used as transducers for converting physical quantities such as force, pressure, temperature, acceleration, into electrical signals, which may be fed to electrical processing circuitry. In addition, silicon devices are sometimes used as actuators or transducers for performing useful functions. The prior art shows a number of these devices, including S. C. Terry, J. H. Jerman and J. B. Angell, "A Gas Chromatographic Air Analyzer Fabricated on a Silicon Wafer," IEEE Trans. Electr. Dev., Vol. ED-26, No. 12, December, 1979, pp 1880-1886, which discloses a silicon chromatographic air analyzer having a capillary tube comprising an etched gas channel in combination with a thermal conductivity detector formed on a silicon substrate for use in rapid chromatographic analysis of various fluids in a highly compact chromatographic system.

M. J. Zdeblick and J. B. Angell, "A Microminiature Electric-to-Fluidic Valve," discloses a valve for controlling the flow of liquid, the valve being comprised of a pair of opposed Pyrex wafers, one of them having a sealing surface formed thereon, and having a silicon wafer sandwiched in between them. A control cavity containing liquid is enclosed by an aluminum membrane with a resistor formed on the Pyrex wafer such that the aluminum membrane may be displaced to be brought into contact or out of contact with the sealing surface to open and close the valve.

J. H. Jerman, "A Miniature Fabry-Perot Interferometer Fabricated Using Silicon Micromachining Techniques," IEEE, April, 1988, discloses a Fabry-Perot interferometer manufactured using silicon micromachining techniques wherein a pair of interactive elements or mirrors which may be moved with respect to each other by changing the applied voltage between the mirrors, thereby allowing differing wavelengths of light to be selectively transmitted through the device.

W. Riethmuller and W. Benecke, "Thermally Excited Silicon Microactuators," IEEE Trans. Elect. Dev., Vol. 35, No. 6, June, 1988, pp. 758-762, discloses a silicon microactuator employing a cantilever beam comprised of a bimetal transducer element which when heated causes the beam to bend. The actuator is based on the bimetal effect, used extensively for the fabrication of temperature-controlled electrical switches. The actuator comprises a silicon-metal sandwich layer and an integrated polysilicon heating resistor as a driving element. The cantilever is approximately 500 microns long.

Unfortunately, each of the prior art devices suffers from one or more drawbacks. If one wishes to build a semiconductor microactuator, it is clear that the teachings of Terry et al. regarding the gas chromatographic device are of minimal help. The Zdeblick et al. microminiature electric-to-fluidic valve, while indicating that a valve can be built from micromachined silicon, is not particularly helpful since a very complicated structure is disclosed requiring that a fluid such as methyl chloride be trapped within a membrane so that the fluid can be heated causing it to expand and contract as bubbles are formed within the fluid. This requires many process steps for its manufacture and is not of great commercial interest.

The Fabry-Perot interferometer, while of interest, relies upon the movement of the two elements with respect to each other under the influence of an electrostatic field extending between them. The electrostatic field strength however, increases greatly as the elements approach each other; much more greatly than does the deflection force upon the device. Due to the rapid change in the electrostatic force with respect to the deflection force, it becomes very difficult to control the distance between the two aligned layers precisely when they are relatively far apart. Thus, the Fabry-Perot interferometer using the electrostatic device is only useful for relatively closely spaced systems.

The thermally excited silicon microactuators of Riethmuller et al. while relatively simple to build, disclose cantilever structures. The cantilever structures, unfortunately, are subject to bending, which makes undesirable for use in a valve structure, since as the cantilever beam bends it is rotated with respect to a structure with which it is to mate, such as a valve seat, which may prevent good seating of the cantilever beam on the valve seat. Thus, when it is desirable to maintain moveable devices in substantial irrotational orientation with respect to each other, the thermally excited silicon microactuator of Riethmuller et al. is not particularly effective. An additional drawback of cantilever beams is that they provide only a relatively low force for a given input.

What is needed is an improved semiconductor microactuator which may be used in valving and other applications and has an element moveable, without significant rotation with respect to a semiconductor substrate.

SUMMARY OF THE INVENTION

The invention primarily relates to a semiconductor microactuator having a deformable moveable member which is substantially irrotational and which in one embodiment, has almost all of its bound edges connected to a substrate support by being formed integral therewith. The deformable moveable member in one embodiment, includes a portion of a diaphragm. Suspension means connected to the portion of the diaphragm, includes the rest of the diaphragm as well as a silicon oxide hinge between the diaphragm and the substrate. The suspension means also includes a pair of layers having differing thermal coefficients of expansion, such that as the temperature of the diaphragm is changed, it moves with respect to the substrate. It may be appreciated that since differential thermal expansion is used to provide the displacement force, the problems associated with the widely varying electric force of the prior art systems is avoided. It may also be appreciated that since a cantilever is not employed, but a diaphragm is employed, substantially irrotational relationships are set up between the two valve halves, allowing the two halves to be conveniently opened and closed while staying in irrotational relationship.

A heater, typically a region of monocrystalline silicon into which a conductivity modifying species has been introduced by diffusion or ion implantation, a thin metal heater comprised of nickel and chromium, or a doped polysilicon layer, is formed on the diaphragm and receives an electric current. The heater is insulated from the silicon substrate, or any other metal, by thermally grown silicon oxide layer having a thickness of about 2,000 Å. In the alternative, deposited dielectrics, such as silicon oxide or silicon nitride, may be used as the insulating layer.

It is a principal aspect of the present invention to provide a semiconductor microactuator having a diaphragm comprised of a pair of differential coefficient thermal elements.

It is another aspect of the instant invention to provide a semiconductor microactuator device having a movable element which maintains a substantially irrotational relationship with a substrate layer to which it is connected.

Other aspects and advantages of the present invention will become apparent upon a perusal of the following specification and claims in light of the accompanying drawings.

DESCRIPTION OF THE PREFERRED EMBODIMENTS

Figure 1:
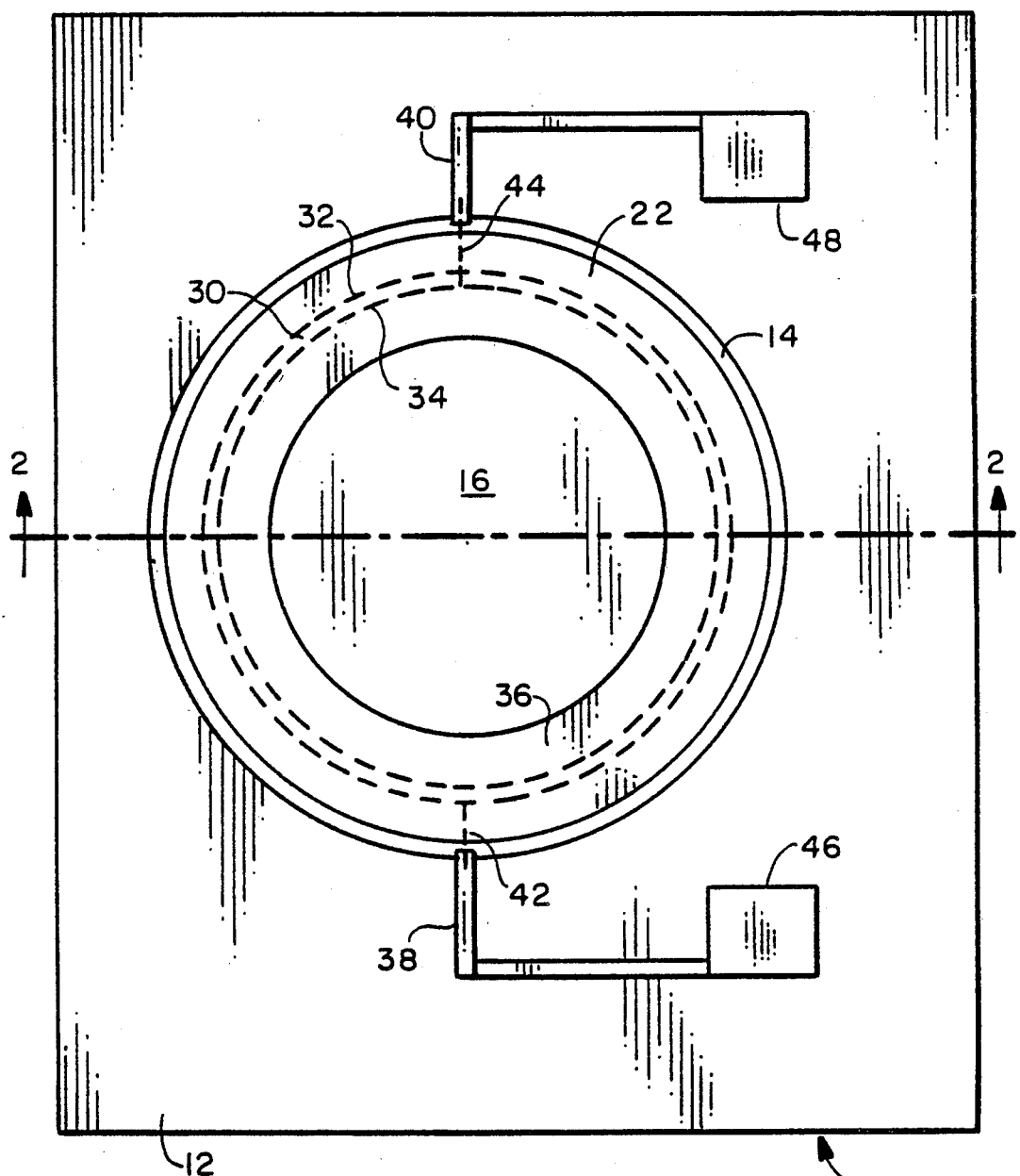
FIG. 1 is an elevational view of a semiconductor microactuator embodying the present invention.

Referring now to the drawings and especially to FIG. 1, a semiconductor microactuator 10 embodying the present invention is shown therein. The semiconductor microactuator 10 has a silicon semiconductor substrate 12 formed from a crystalline silicon die fabricated from a monocrystalline silicon wafer and having a thickness of 300 microns. Suspension means 14 is connected to it. A movable element 16 is connected to the suspension means 14 to be displaced solely translationally, or in other words irrotationally, with respect to the semiconductor substrate 12.

Figure 2:
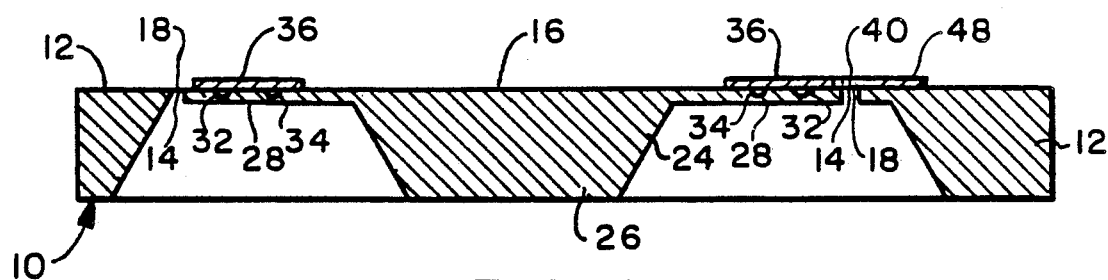
FIG. 2 is a sectional view of the semiconductor microactuator shown in FIG. 1 taken substantially along line 2—2 of FIG. 1.
Figure 3:
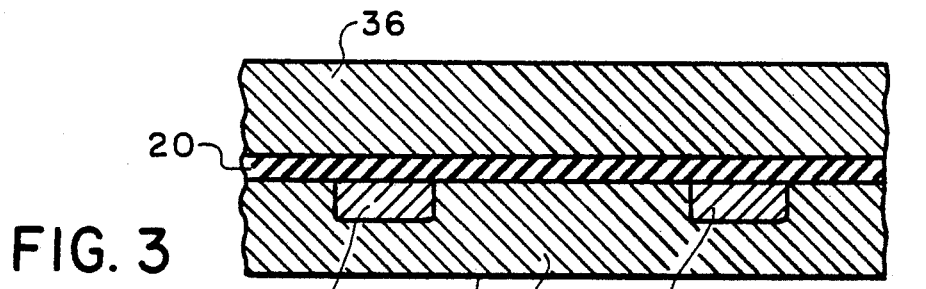
FIG. 3 is an enlarged sectional view of the sectional view of FIG. 2 showing details of the heaters.
Figure 4:
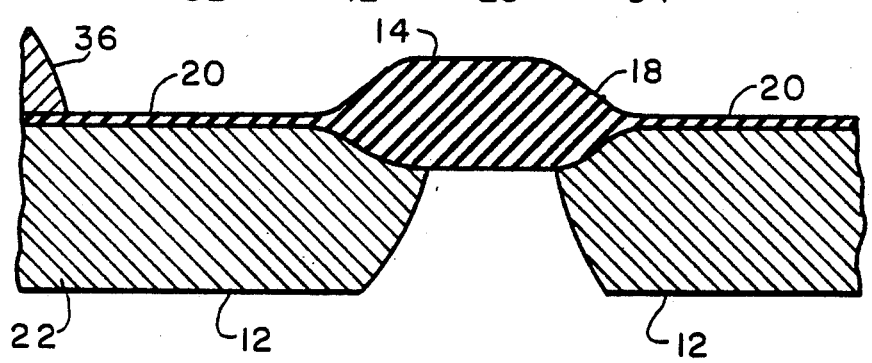
FIG. 4 is an enlarged sectional view of an oxide hinge of the semiconductor microactuator shown in FIG. 2.
Figure 5:
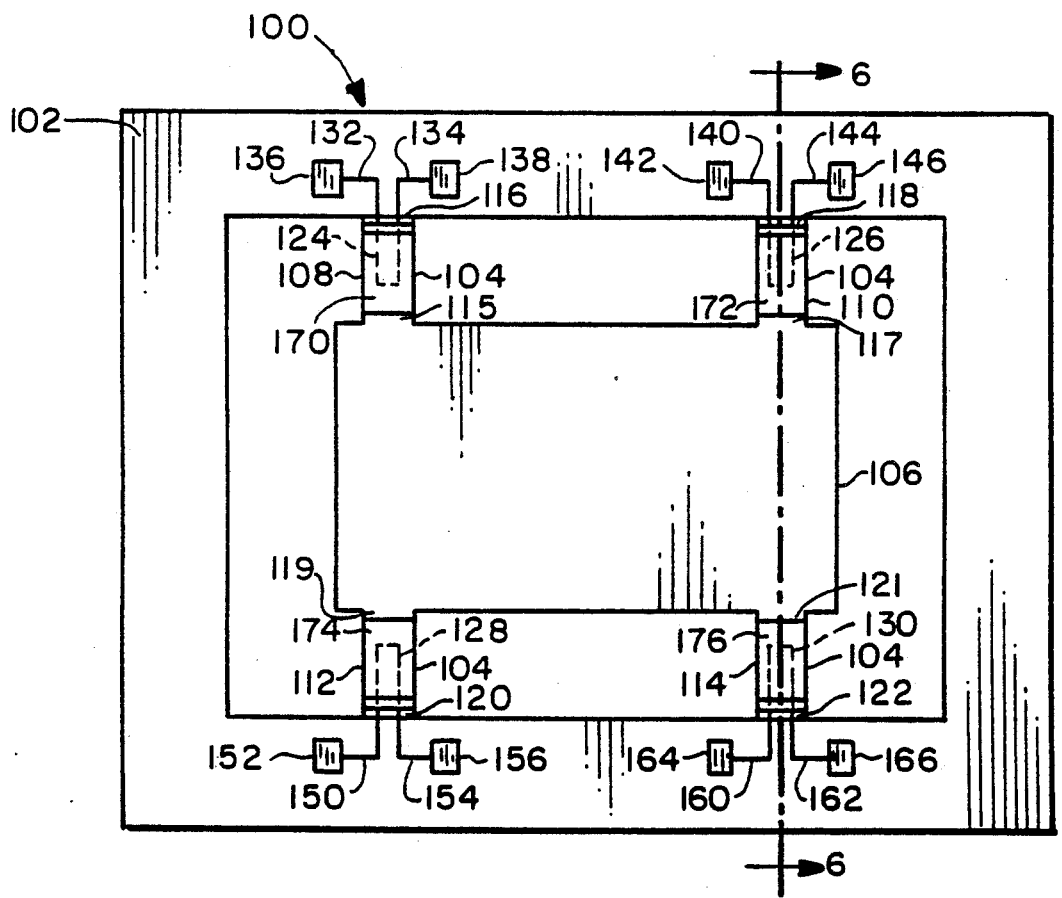
FIG. 5 is an elevational view of a multiple beam semiconductor microactuator having a movable element connected to the multiple beams and embodying the present invention.
Figure 6:
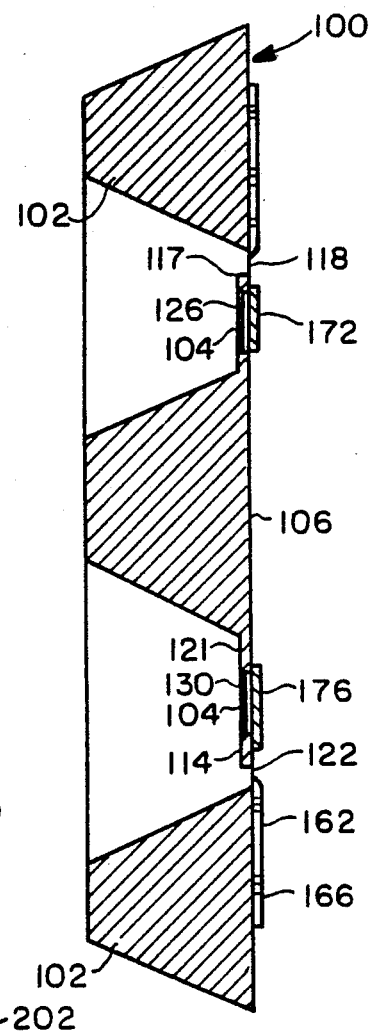
FIG. 6 is a sectional view of the multiple beam semiconductor microactuator shown in FIG. 5 taken along line 6—6 of FIG. 5.

The suspension means 14, as may best be seen in FIGS. 1, 2 and 4, includes a hinge 18 comprised of a layer of thermally grown silicon oxide. The hinge 18 is formed integrally with a thinner layer of thermally grown silicon oxide 20 extending over the epitaxial silicon substrate 12. The hinge portion of the thermally grown oxide layer has a thickness of about 2 microns. The other portions of the thermally grown oxide layer 20 have a thickness of about 2,000 Å. The oxide layer 20 is primarily used for passivation and for electrical insulation, as will be seen hereinafter. The hinge 18 is circular and in part, defines a circular diaphragm 22, which is connected to it about its periphery. The diaphragm 22 includes a silicon body portion 24 having a boss 26 formed integrally therewith. A thinner diaphragm portion 28 has a heater 30 formed therein comprising a first heater ring 32 and a second heater ring 34. The first and second heater rings 32 and 34 are concentric with the circular diaphragm 22 and are comprised of diffused regions of the monocrystaline silicon, as may best be seen in FIGS. 2 and 3. The silicon oxide layer 20 covers the diffused regions 32 and 34 to insulate them electrically from other portions of the semiconductor microactuator 10. A circular metal ring 36 comprised of electron beam or sputter deposited covers a portion of the oxide layer over the heater rings 32 and 34. The heater rings 32 and 34 are connected via metal leads 38 and 40 to diffused current supply regions 42 and 44. The lead 38 is connected to an aluminum bonding pad 46 on the substrate 12. Suitable leads may be wire bonded to the bonding pads 46 and 48 to supply electric current through the bonding pads through the leads 38 and 40 and to the diffused regions 32 and 34.

When the heater rings 32 and 34 receive electric current they heat, causing the thinner diaphragm portion 28 to heat and expand at a thermal expansion rate governed by the thermal expansion coefficient of monocrystalline silicon. The metal ring 36 lying above the diffused regions 32 and 34 also expands, but at a higher rate, due to its greater thermal expansion coefficient, causing the thinner portions 28 to bow and displacing the diaphragm 22. Thus, by controlling the amount of electric current fed to the diffused regions 32 and 34 the amount of displacement of the diaphragm 16 can also be controlled. In addition, since the displacing force is being supplied throughout the entire periphery of the thinner diaphragm region 28, it may be appreciated that relatively high force may be supplied to the movable member or boss portion 26 of the diaphragm so that useful work can be done, for instance, operating a valve.

An alternative embodiment of a semiconductor microactuator is a semiconductor microactuator 100. As was the case for the semiconductor microactuator 10, the semiconductor microactuator 100 is a silicon semiconductor microactuator and includes a silicon semiconductor substrate 102 formed from a conventional silicon wafer die. Suspension means 104 is connected to the silicon semiconductor substrate 102 and a movable element 106 is connected to the suspension means 104.

The suspension means 104 includes a plurality of beams, respectively numbered 108, 110, 112 and 114. The beam 108 has a thin silicon layer 115 connected to a hinge 116, comprised of silicon oxide and to the semiconductor substrate 102. The beam 110 has a thin silicon layer 117 connected at a silicon oxide hinge 118 to the silicon semiconductor substrate 102. The beam 112 has a thin silicon layer 119 connected at a silicon oxide hinge 120 to the semiconductor substrate 102 and the beam 114 has a thin silicon layer 121 connected at a silicon oxide hinge 122 to the substrate 102. Each of the silicon layers 115, 117, 119 and 121 is also connected to the movable element 106.

Each of the beams 108 through 114 also includes a diffused heater. A diffused heater 124 is in the beam 108. A diffused heater 126 is in the beam 110. A diffused heater 128 is in the beam 112 and a diffused heater 130 is in the beam 114. The diffused heater 124 is connected to a pair of leads 132 and 134 formed from electron beam deposited aluminum on the surface of the substrate 102. The lead 132 is connected to a bonding pad 136 and the lead 134 is connected to a bonding pad 138 for receiving electrical current from a suitable source. Likewise, the diffused heater 126 is connected to a lead 140, which is connected to a bonding pad 142 on the surface of the substrate 102. A lead 144 and a bonding pad 146 are also connected to the other side of the diffused heater 126 to supply electrical current from a suitable source to the diffused heater 126. The diffused heater 128 has a lead 150 and a bonding pad 152 connected thereto, as well as a lead 154 and a bonding pad 156. The diffused heater 130 has a lead 160 and a lead 162 connected to it to supply it with electric power. A bonding pad 164 is connected to the lead 160. A bonding pad 166 is connected to the lead 162.

Each of the beams 104 also has a metal layer having a coefficient on top of a silicon oxide layer covering the diffused heater regions of the silicon layers 115, 117, 119 and 121. The beam 108 has an aluminum layer 170. The beam 110 has an aluminum layer 172. The beam 112 has an aluminum layer 174. The beam 114 has an aluminum layer 176. The aluminum layers 170, 172, 174 and 176 are deposited using either electron beam or sputter deposition techniques that are well known to those skilled in the silicon wafer fabrication art. It may be appreciated that the multiple beams provide high force and irrotational movement of the movable element 106 with respect to the substrate 102.

Figure 7:
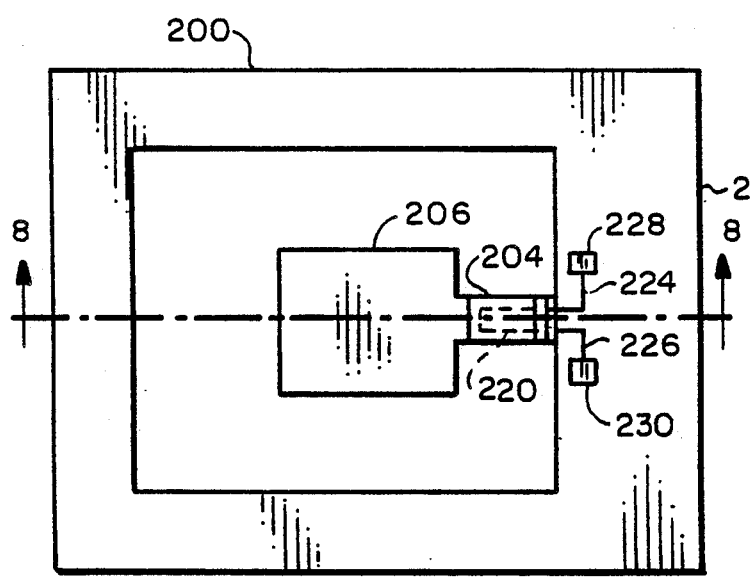
FIG. 7 is an elevational view of another multiple beam semiconductor microactuator having a movable element connected to multiple beams and embodying the present invention.
Figure 8:
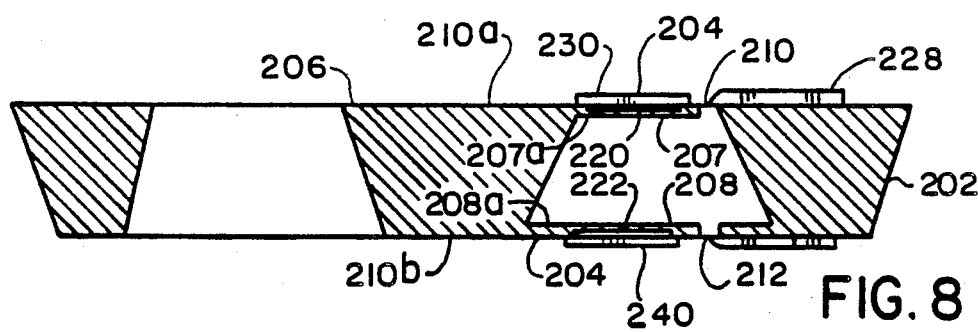
FIG. 8 is a sectional view of the multiple beam semiconductor microactuator shown in FIG. 7 and taken along line 8—8 of FIG. 7.

Referring now to FIGS. 7 and 8, a semiconductor microactuator 200 comprising a silicon semiconductor substrate 202 having suspension means 204 connected to it, has a movable element 206 connected to the suspension means 204. The semiconductor substrate 202 is a silicon semiconductor die of the type that may be fabricated from a silicon wafer and has a thickness of 300 microns. The suspension means 204 includes a top beam 207 having a thin silicon layer 207 and an opposed or bottom beam 208. The beam 207 is connected to a silicon oxide hinge 210 connected to the substrate 202. The beam 208 is connected to a silicon oxide hinge 212, connected to the substrate 202. The beam 207 is substantially flush with a top surface 210a of the movable element 206. The beam 208 is substantially flush with a bottom surface 210b of the movable element 206. The beam 207 has a diffused region 220 formed therein comprising a heater. The beam 208 has a diffused region 222 formed therein and a comprising a heater. A lead 224 and a lead 226 are connected to the diffused heater 220 to supply electric current thereto. A bonding pad 228 is connected to the lead 224 and a bonding pad 230 is connected to the lead 226. The leads 224 and 226 and the bonding pads 228 and 230 are comprised of electron beam or sputter deposited aluminum. An aluminum layer 232 overlies a silicon oxide layer on the beam 207 to electrically insulate the diffused region 220 from the metal layer 230. Likewise, a metal layer 240 overlies the diffused region 222 of the beam 208. It may be appreciated that the beams 207 and 208 are in alignment and support the movable element 206. It may also be appreciated that the beams 207 and 208 move the movable element 206 in either of two directions by applying differential force thereto. This can be done by applying differential amounts of electric current to their respective heaters. Thus, when one beam has relatively little or no electric current to it and the other has a large amount of electric current supplied to its diffused heater, the movable element 206 will be displaced with a force double that normally encountered in cantilever beam structures. Thus, the semiconductor microactuator is a push-pull structure able to supply high force in selected applications.

Figure 9:
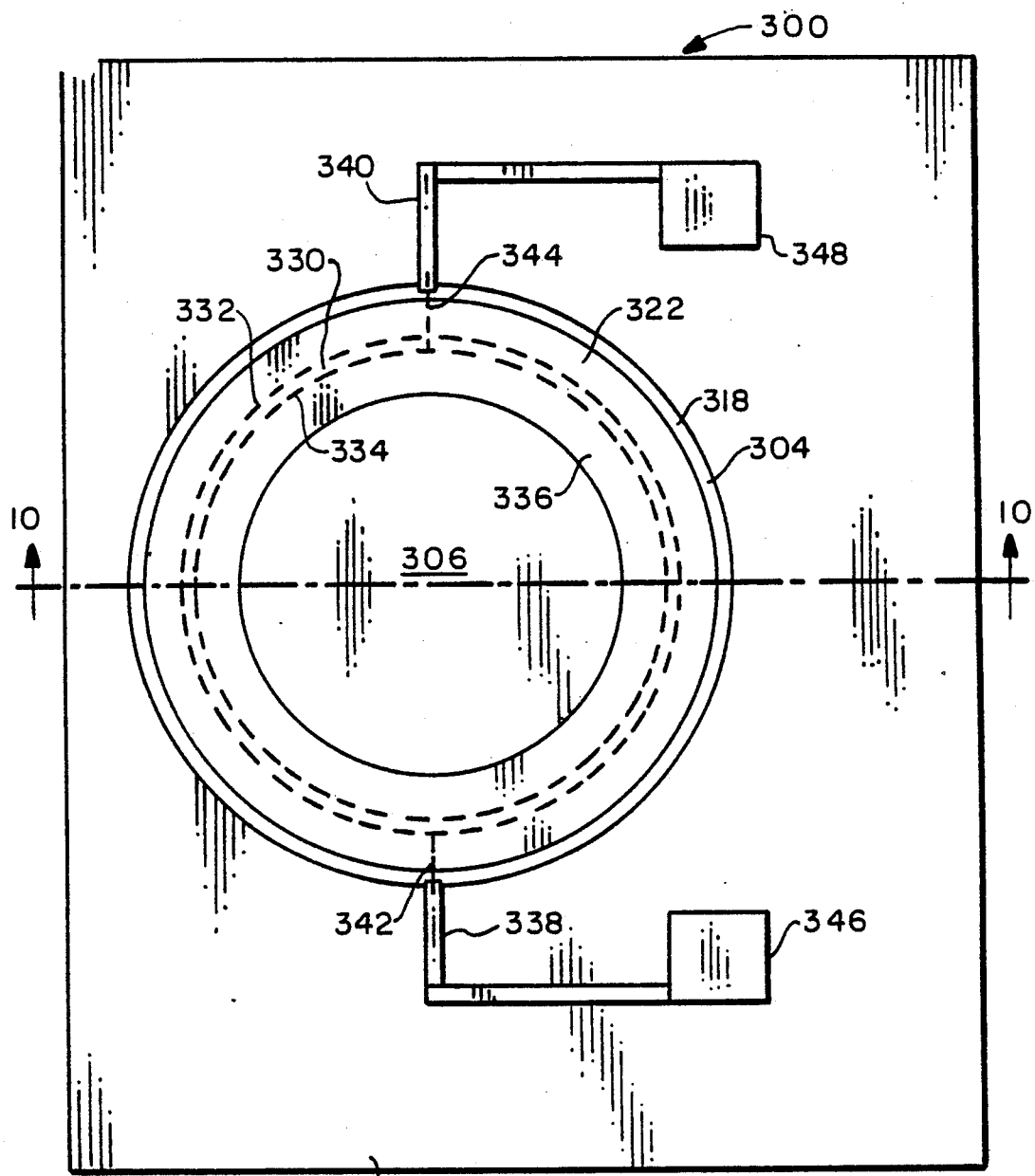
FIG. 9 is an elevational view of a semiconductor microactuator valve embodying the present invention.
Figure 10:
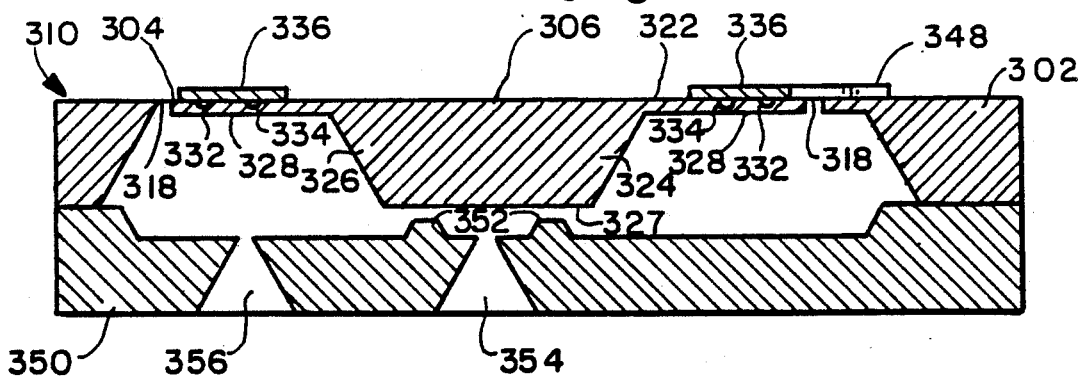
FIG. 10 is a sectional view of the semiconductor microactuator valve shown in FIG. 9 and taken along line 10—10 of FIG. 9.

A semiconductor microactuator valve 300, as may best be seen in FIGS. 9 and 10, includes a silicon semiconductor substrate 302 having suspension means 304 connected thereto and a movable element 306 connected to the suspension means 304. The suspension means 304 includes a hinge 318, comprised of thermally grown silicon oxide. A diaphragm 322 is connected to the oxide hinge 318 and includes a silicon body portion 324. The silicon body portion 24 of the diaphragm includes a boss 326 and a thinner portion 328 formed integrally with the boss 326. The thinner silicon portion 328 is connected to the silicon oxide hinge 318. The thinner portion 328 also includes therein a heater 330 comprising a pair of diffused region heating elements 332 and 334 which are areas of the crystalline silicon 328 which have had conducting enhancing impurities diffused or ion implanted therein. A circular metal ring 336 comprising electron beam or sputter deposited aluminum overlies the diffused heaters 332 and 334. A silicon oxide layer, not shown, separates the ring 336 from the diffused heaters 332 and 334 to provide electrical insulation to the diffused heaters. A metal lead 338 is connected to a diffusion path 342. A metal lead 340 is connected to a diffusion path 344. A bonding pad 346 is connected to the metal lead 338. A bonding pad 348 on the substrate 302 is connected to the metal lead 340. Electric current is supplied to the heaters 332 and 334 through the bonding pads 346 and 348.

A second substrate 350 which may comprise silicon, Pyrex glass or the like has formed therein a valve seat 352 around a valve orifice 354. A second valve orifice 356 is also formed therein. It may be appreciated that when electrical energy is supplied to the diffused heaters 332 and 334, the surface 327 of the boss 326 may be moved into and out of contact with the valve seat 352 thereby opening and closing the valve 310. Sufficient valve closure force is supplied by the differential thermal expansion of the silicon and aluminum of the region 328 and the metal ring 336.

Figure 11:
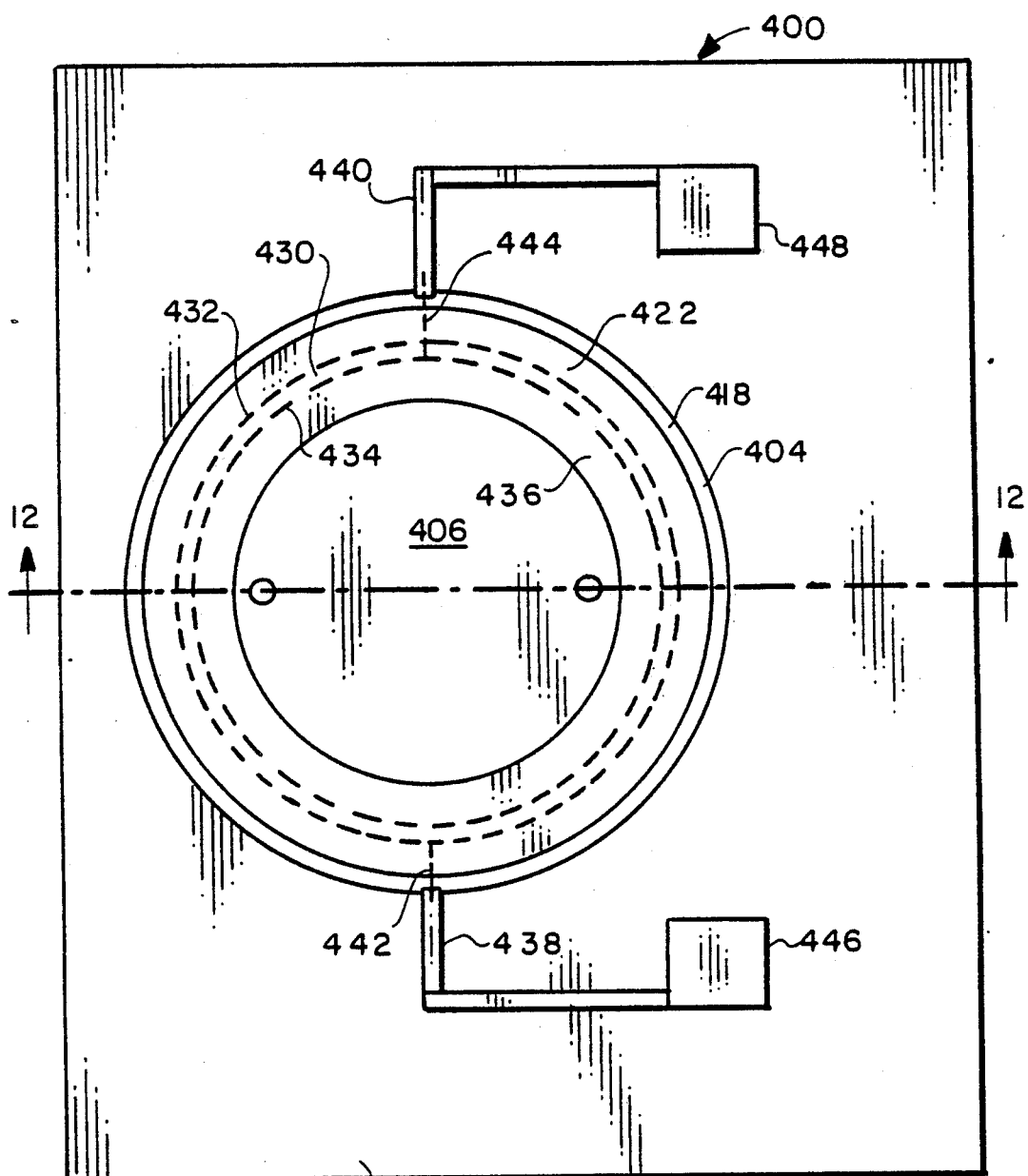
FIG. 11 is an elevational view of another semiconductor microactuator valve embodying the present invention and having a perforated diaphragm for allowing a fluid to flow therethrough.
Figure 12:
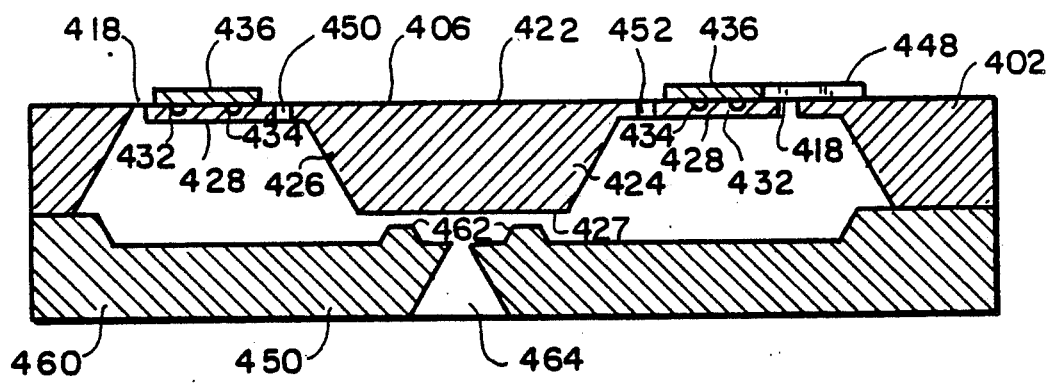
FIG. 12 is a sectional view of the semiconductor microactuator shown in FIG. 11 and taken along line 12—12 of FIG. 11.

A second embodiment of a semiconductor microactuator valve may best be seen in FIGS. 11 and 12. A semiconductor microactuator valve 400 comprising a silicon semiconductor substrate 402, suspension means 404 connected to the silicon semiconductor substrate 402 and a movable element 406 suspended from the suspension means 404.

The suspension means 404 includes a hinge 418 comprising a thermally grown silicon oxide. A diaphragm 422 is connected to the hinge 418 and includes a silicon body portion 424. The silicon body portion 424 has a boss 426 defined in part by a surface 427. A thinner portion 428 of the diaphragm 422 is connected to the boss 426 and to the hinge 418. A heater 430 comprises a first diffused ring region 432 and a second diffused ring region 434, concentric with the first diffused ring region 432, formed in the thinner regions 428. A silicon oxide layer, not shown, overlies the diffused regions 432 and 434 and has a metal ring 436 comprised of electron beam deposited aluminum, overlying it. A lead 438 and a lead 440 are connected respectively to diffused conductors 442 and 444 to supply electric current to the diffused rings 432 and 434 which dissipate heat therefrom. A bonding pad 446 is connected to the lead 438. A bonding pad 448 is connected to the lead 440. A pair of apertures 450 and 452 are formed in the diaphragm 412 to admit fluids therethrough. A substrate 460, which may be either a silicon substrate or a Pyrex substrate, is connected to the substrate 402. The substrate 460 includes a valve seat 462 formed thereon surrounding a valve orifice 464.

It may be appreciated that when the face 427 of the boss 426 is not in contact with the valve seat 462, the fluid is allowed to flow from either orifice 450 or or 452 through the orifice 464. When heat is supplied from the diffused heaters 432 and 434, the face 427 of the boss 426 is forced into engagement with the valves seat 462 thereby interrupting flow of fluid through the orifice 464, 450 and 452. In the event that it is desirable to throttle fluid flow through the orifice 464, the valve 400 may have the valve face 427 moved to an intermediate position between the fully open and the fully closed position. In this embodiment, the semiconductor microactuator valve 400 has the pressure across the diaphragm 422 effectively equalized in order to insure that the only mechanical forces on the diaphragm 422 are due to the structure itself and to the amount of electric current supplied to the heaters 432 and 434.

Figure 13:
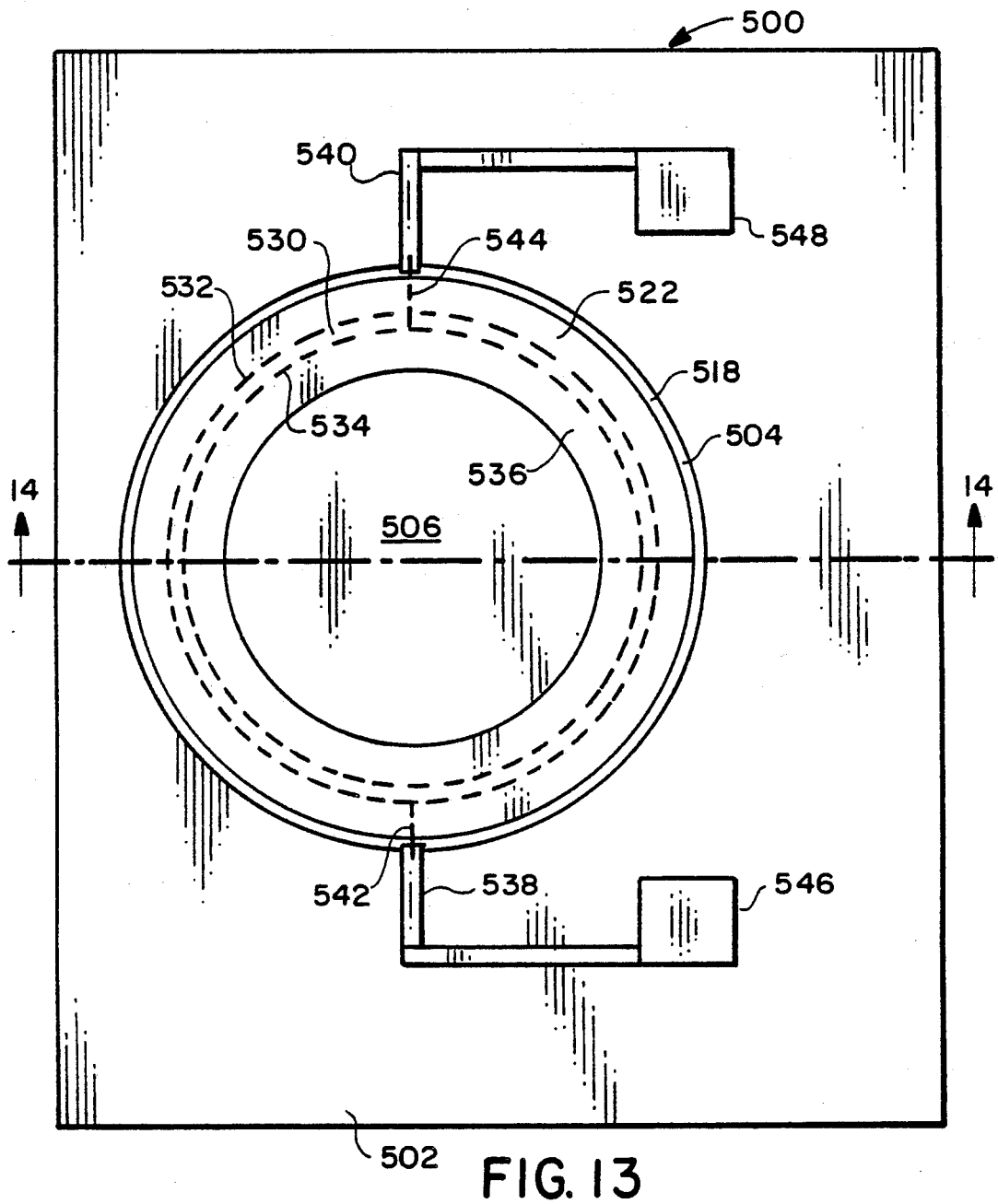
FIG. 13 is an elevational view of a semiconductor microactuator interferometer embodying the present invention.
Figure 14:
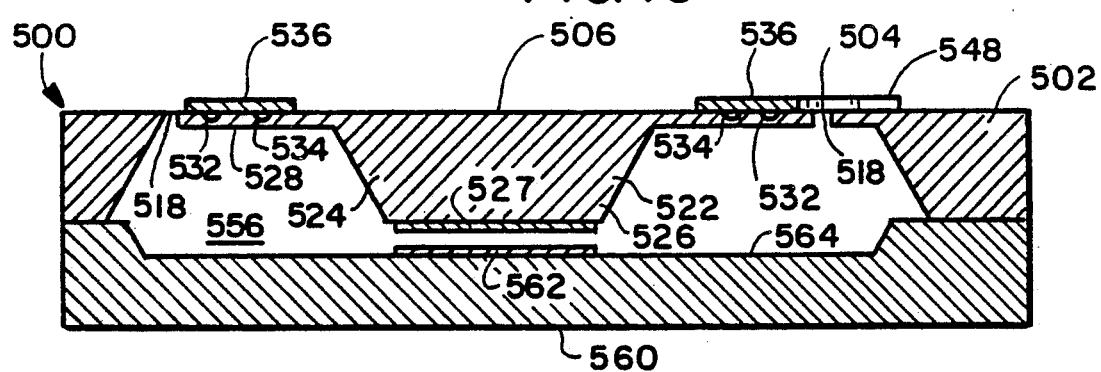
FIG. 14 is a sectional view of the semiconductor microactuator interferometer shown in FIG. 13 and taken along line 14—14 of FIG. 13.

A semiconductor microactuator interferometer 500, as may best be seen in FIGS. 13 and 14, includes a semiconductor substrate 502, comprised of silicon. A suspension means 504 is connected to the substrate 502 and a movable element 506 is connected to the suspension means 504.

The suspension means 504 comprises a hinge 518 comprised of thermally grown silicon oxide. A diaphragm 522 is connected to the hinge 518 and includes a silicon body portion 524 having a boss 526. An optical element such as a thin film dielectric mirror 527 which may comprise multiple silicon nitride and silicon oxide layers, is sputter deposited or electron beam deposited on the boss 526. A thinner portion 528 of the diaphragm 522 is formed integral with the silicon body portion 524 and has a heater 530 formed therein. The heater 530 includes a first heater ring 532 diffused into the silicon of the thinner region 528 and the second heater ring 534 diffused into the silicon of the thinner portion 528. A circular metal ring 536 overlies the first and second heater rings 532 and 534 and is separated therefrom by a thin layer of thermally grown silicon oxide, not shown. A metal lead 538 is connected to the heaters 532 and 534, as is a metal lead 540. A diffused lead 542 links the metal lead 538 to the heater rings 532 and 544 as does a diffused lead 544. A bonding pad 546 is connected to the metal lead 538 to supply electric current thereto. A bonding pad 548 is connected to the metal lead 540 to supply current thereto. Since the silicon is transparent to infrared radiation, light in the infrared region passes through the diaphragm 522 and into a cavity 556. A second substrate 560, which may be comprised of silicon or Pyrex glass has an optical element 562 positioned on a surface 564 thereof. The optical element 562 in this embodiment is a reflector or thin film dielectric mirror comprised of multiple silicon nitride and silicon oxide layers.

It may be appreciated that when electric current is supplied to the diffused heater rings 532 and 534, movement of the diaphragm 522 is affected. In particular, the mirror 527 attached to the diaphragm 522 moves. As the mirror 527 is moved toward and away from the mirror 562 various wavelengths of light may be passed selectively due to the interferometric effect between the dieletric mirrors, as is well known in Fabry-Perot interferometers.

Thus, it may be appreciated that each of the silicon microactuators embodying the present invention, include the valves and the interferometer, have movable elements which are displaceable by the differential expansion of silicon and metal when heated or cooled. Each movable element is constrained to move irrotationally. This is particularily important for operation of the valves and the interferometer. Additionally, the silicon oxide hinges thermally isolate the heaters from the substrate to maximize the amount of element displacement for a given elective current. The use of the multiple beams or circular web or thinner regions provides high force outputs from the microactuators.

While there have been illustrated and described particular embodiments of the present invention, it will be appreciated that numerous changes and modifications will occur to those skilled in the art which fall within the true spirit and scope of the present invention.

What is claimed is:

1. A semiconductor microactuator, comprising:
   a semiconductor substrate;
   a movable element; and
   suspension means coupled to said semiconductor substrate and to said movable element for suspending said movable element from said semiconductor substrate and for constraining displacement of said movable element with respect to said semiconductor substrate solely to irrotational displacements, said suspension means having a first portion having a first thermal coefficient of expansion and a second portion having a second thermal coefficient of expansion different from said first thermal coefficient of expansion for displacing said movable element with respect to said semiconductor substrate when the temperatures of said first portion of said suspension means and said second portion of said suspension means are varied.

2. A semiconductor microactuator as defined in claim 1, wherein said movable element comprises a first portion of a diaphragm and said suspension means comprises a second portion of said diaphragm.

3. A semiconductor microactuator as defined in claim 2, further comprising means for heating said diaphragm to effect displacement of said second portion of said diaphragm with respect to said semiconductor substrate.

4. A semiconductor microactuator as defined in claim 3, further comprising a silicon oxide hinge for thermally isolating said movable element from said semiconductor substrate.

5. A semiconductor microactuator, comprising:
a semiconductor substrate;
a pair of connecting bars connected to said semiconductor substrate, each of said connecting bars having a first thermal coefficient of expansion;
a movable element connected to said connecting bars and suspended therefrom; and
a differential coefficient layer connected to one of said connecting bars and having a second thermal coefficient of expansion differing from that of said first thermal coefficient of expansion to effect displacement of said movable element with respect to said semiconductor substrate as a temperature of said connecting bar having the differential coefficient layer varies.

6. A semiconductor microactuator as defined in claim 5, wherein the connecting bars each are connected respectively to a pair of opposite sides of said movable element.

7. A semiconductor microactuator valve, comprising:
a semiconductor substrate;
a movable element;
suspension means coupled to said semiconductor substrate and to said movable element for suspending said movable element from said semiconductor substrate and for constraining displacement of said movable element with respect to said semiconductor substrate solely to irrotational displacements, said suspension means having a first layer having a first thermal coefficient of expansion and a second layer having a second thermal coefficient of expansion different from said first thermal coefficient of expansion for displacing said movable element with respect to said semiconductor substrate when the temperatures of said first layer and said second layer are varied; and
a fluid flow control element connected to said movable element.

8. A semiconductor microactuator valve as defined in claim 7 wherein the movable element comprises a diaphragm.

9. A semiconductor microactuator valve as defined in claim 8, wherein the diaphragm is perforated to admit fluids to an interior portion of said valve.

10. A semiconductor microactuator optical device, comprising:
a semiconductor substrate;
a movable element;
suspension means coupled to said semiconductor substrate and to said movable element for suspending said movable element from said semiconductor substrate and for constraining displacement of said movable element with respect to said semiconductor substrate solely to irrotational displacements, said suspension means having a first layer having a first thermal coefficient of expansion and a second layer having a second thermal coefficient of expansion different from said first thermal coefficient of expansion for displacing said movable element with respect to said semiconductor substrate when the temperatures of said first layer said second layer are varied; and
an optical element connected to said movable element.

11. A semiconductor microactuator optical device as defined in claim 10, wherein said optical element comprises a reflector.

12. A semiconductor microactuator as defined in claim 1, wherein said first portion of said suspension means comprises a semiconductor material having said first thermal coefficient of expansion into which a heating element is diffused and said second portion of suspension means comprises a film having said second thermal coefficient of expansion disposed over and electrically insulated from said diffused heating element.

13. A semiconductor microactuator as defined in claim 12, wherein said semiconductor material is comprises of monocrystalline silicon and said film is a metal film.

* * * * *